US006383652B1

(12) United States Patent
Templeton et al.

(10) Patent No.: US 6,383,652 B1
(45) Date of Patent: May 7, 2002

(54) WEATHERABLE BUILDING PRODUCTS

(75) Inventors: G. Daniel Templeton, Ft. Wayne; Kenneth J. West, Grabill; Ronald C. Minke, Ft. Wayne; Cem A. Porter, Garrett, all of IN (US); S. Hunter W. Brooks, Rochester Hills, MI (US)

(73) Assignee: TT Technologies, Inc., Maumee, OH (US)

( * ) Notice: Subject to any disclaimer, the term of this patent is extended or adjusted under 35 U.S.C. 154(b) by 0 days.

(21) Appl. No.: 09/280,605

(22) Filed: Mar. 29, 1999

Related U.S. Application Data

(63) Continuation of application No. 08/791,023, filed on Jan. 27, 1999, now abandoned.
(60) Provisional application No. 60/010,838, filed on Jan. 30, 1996.

(51) Int. Cl.[7] ......................... B32B 27/06; B32B 27/08; B32B 27/10

(52) U.S. Cl. ....................... 428/507; 428/220; 428/506; 428/508; 428/510; 428/514; 427/372.2

(58) Field of Search ................................ 428/507, 220, 428/506, 508, 510, 514; 427/372.2

(56) References Cited

U.S. PATENT DOCUMENTS

| | | | |
|---|---|---|---|
| 1,593,342 A | 7/1926 | Meigs | |
| 1,868,216 A | 7/1932 | Meigs | |
| 2,553,512 A | 5/1951 | Cotton, Jr. | |
| 2,706,160 A | 4/1955 | Glab | |
| 2,714,072 A | 7/1955 | Roberts | |
| 2,757,115 A | 7/1956 | Heritage | |
| 2,759,837 A | 8/1956 | Roberts | |
| 2,872,337 A | 2/1959 | Heritage et al. | |
| 3,252,815 A | 5/1966 | Glab | |
| 3,280,237 A | 10/1966 | Corbin et al. | |
| 3,668,286 A | 6/1972 | Brooks et al. | |
| 3,696,082 A | 10/1972 | Smith | |
| 3,714,097 A | 1/1973 | Cautilli et al. | |
| 3,883,455 A | 5/1975 | Peos | |
| 3,935,151 A | 1/1976 | Nickerson et al. | |
| 3,996,177 A | 12/1976 | Ludwig | |
| 4,082,903 A | 4/1978 | Chow | |
| 4,128,519 A | 12/1978 | Bartoszek et al. | |
| 4,136,207 A | 1/1979 | Bender | |
| 4,175,148 A | 11/1979 | Luck et al. | |
| 4,195,019 A | 3/1980 | Babina et al. | |
| 4,201,802 A | 5/1980 | Vande Kieft | |
| 4,283,450 A | 8/1981 | Luck et al. | |
| 4,305,989 A | 12/1981 | Luck et al. | |
| 4,336,174 A | 6/1982 | Sanfilippo et al. | |
| 4,374,899 A | 2/1983 | Sanfilippo et al. | |
| 4,424,300 A | 1/1984 | Udvardy et al. | |
| 4,433,126 A | 2/1984 | Hsu et al. | |
| 4,474,846 A | 10/1984 | Doerer et al. | |
| 4,479,912 A | 10/1984 | Bullock | |
| 4,517,147 A | 5/1985 | Taylor et al. | |
| 4,521,495 A | 6/1985 | Hahn, Jr. | |
| 4,539,252 A | 9/1985 | Franz | |
| 4,580,383 A | 4/1986 | Pittman et al. | |
| 4,592,186 A | 6/1986 | Lynch et al. | |
| 4,610,119 A | 9/1986 | Bench, Sr. | |
| 4,627,999 A | 12/1986 | Hsu | |
| 4,786,547 A | 11/1988 | St-Michel | |
| 4,788,808 A | 12/1988 | Slocum | |
| 4,852,314 A | 8/1989 | Moore, Jr. | |
| 4,913,972 A | 4/1990 | Grunewalder et al. | |
| 5,017,319 A | 5/1991 | Shen | |
| 5,028,286 A | 7/1991 | Hsu | |
| 5,035,944 A | 7/1991 | Frazza et al. | |
| 5,064,592 A * | 11/1991 | Ueda et al. | 264/112 |
| 5,134,023 A | 7/1992 | Hsu | |
| 5,135,793 A | 8/1992 | Socha | |
| 5,182,313 A | 1/1993 | Carson | |
| 5,194,307 A | 3/1993 | Gardeski | |
| 5,286,778 A | 2/1994 | Dean et al. | |
| 5,344,867 A | 9/1994 | Morgan et al. | |
| 5,395,436 A | 3/1995 | Setzke | |
| 5,537,789 A | 7/1996 | Minke et al. | |
| 5,965,207 A | 10/1999 | Kropfeld et al. | |

FOREIGN PATENT DOCUMENTS

| | | |
|---|---|---|
| EP | 0 161 766 A1 | 11/1985 |
| GB | 1558411 | 1/1980 |

OTHER PUBLICATIONS

Chemical Modification of Wood; Roger M. Rowell, University of Wisconsin, Madison, Wisconsin, pp. 703–757.

Elder, Pyrolysis of Wood, in Hon, David N. –S. and Nobuo Siraishi, Wood and Cellulosic Chemistry, Marcel Dekker, Inc.

Van Krevelen, D.W. (1990) Properties of Polymers, 3rd Ed., Elsevier, Amsterdam, pp. 72–80, 244–246.

Cowie, J.M.G. (1993) Polymers: Chemistry and Physics of Modern Materials, Blackie Academic & Professional, Gascow.

P.T. Delassus and W.L. Treptou, Poly (Vinylidene Chloride) Copolymers (PVDC), Barrier Resins and Fabrication Laboratory, The Dow Chemical Company, Midland, MI, pp. 567–574 and pp. 554–555.

* cited by examiner

*Primary Examiner*—P. Hampton-Hightower
(74) *Attorney, Agent, or Firm*—Brooks & Kushman P.C.

(57) ABSTRACT

The present invention relates to a weatherable building product comprising a wood member. The wood member has at least a portion which is coated with a coating composition comprising an interpenetrating polymer network of an acrylic latex and a vinylidene chloride polymer. The wood member comprises solid wood or fiber-based materials.

37 Claims, No Drawings

WEATHERABLE BUILDING PRODUCTS

This application is a continuation-in-part of U.S. Ser. No. 08/791,023, filed Jan. 27, 1997 now abn, titled WEATHERABLE BUILDING PRODUCTS COMPRISED OF PRESSURE FORMED FILLED NOVOLAC PHENOLIC MATERIALS, which claims the benefit of U.S. Provisional Application No. 60/010,838, filed Jan. 30, 1996, titled "WEATHERABLE BUILDING PRODUCTS COMPRISES OF PRESSURE FORMED FILLED NOVOLIC PHENOLIC MATERIALS".

TECHNICAL FIELD

The present invention relates to weatherable building products made of wood members coated with a weatherability coating composition.

BACKGROUND ART

Wood members have long been used in the manufacture of building products. Examples of such building products include, but are not limited to, door jambs, end rails, stiles, rails, and compression molded door skins, interior and exterior trim products, pilasters, railings and posts, stairs, mull posts, dimensional members, thresholds, brickmould, ultra-light-, medium- or high-density fiberboard, oriented strand board, laminated strand lumber, laminated beams, plywood, particle board, and plastic wood. These wood members can be made from solid wood or fiber-based materials. By fiber-based materials, it is meant, wood fiber or fibers of agricultural, waste, and recylate byproducts.

People appreciate these building products formed of wood members because of their relatively inexpensive cost, structural strength properties, and warm feel. However, building products formed of wood members are susceptible to damage due to exposure to water, moisture and sunlight.

For instance, unprotected wood members weather relatively rapidly as soluble sugars are leached by water and scissioned by ultraviolet light in sunlight. Within two or three months, the surfaces of most wood members exposed to the weather are damaged sufficiently so as to be unpaintable.

In addition, many wood members expand and contract significantly in equilibration with ambient humidity. The result in the building industry may include the following few examples:

- remanufacturing techniques used on small undesirable scraps of wood members, such as fingerjointing, often fail during two or three months exposure to direct water contact or moisture vapor;
- thin veneers often bubble and peel off when a combination of moisture vapor and direct water wicking in the substrate cause swelling of the substrate or stresses within the thin veneers; and
- thick veneers or capstocks often fail at the adhesive line due to differential linear expansion of the two substrates due to humidity response.

Compounding this expansion phenomenon is that the percentage of expansion approaches an asymptotic relationship when standing water reaches the wood member or when very high or very low relative humidity levels are achieved. Such elevated relative humidity levels are very common in the southern U.S. costal and island regions in the summer as well as the northern Great Plains regions during winter.

A quantifiable measure of the degree of damage wood members can experience from exposure to water can be determined by ascertaining the percent moisture linear expansion according to ASTM No. D-1037. The acceptable percent moisture linear expansion will vary for each building product depending on a variety of factors. These factors include, but are not limited to, type of building product, type of wood member, allowable tolerance, and presence of expansion inhibitors, such as the mechanical coupling with other members. For instance, it has been determined that successful Medium Density Fiberboard (MDF) compression mold door skins for doors having a wood frame and having a polyurethane core, require that moisture linear expansions be less than about 0.1% for the skins, and more preferably about 0.0–0.05% to inhibit warping or cupping in the doors when assembled. In door entries, which include a door hingedly connected with a frame comprising a plurality of jambs, the traditional gap between the door and each jamb is less than about 2.3 mm on a 2.4 m high door. Thus, the net moisture linear expansion for such door entries must be less than about 0.01%, and preferably less than about 0.005%.

Accordingly, it would be desirable to be able to provide weatherable building products made of wood members which are relatively resistant to damage from exposure to water, moisture, and sunlight. Typically, it is desirable to provide weatherable building products made of wood members which have moisture linear expansions of less than about 0.1%. It would be further desirable to provide weatherable compression molded door skins formed of wood members having moisture linear expansions of less than about 0.1%, and preferably less than about 0.05%. It would also be desirable to provide weatherable door entries made of wood members having moisture linear expansions of less than about 0.01%, and preferably about 0.005%.

Moreover, it would be further desirable to provide weatherable building products made of wood members that will withstand attacks from moisture vapor, direct water, and sunlight and perform well in weatherability tests while remaining readily machined and manipulated by typical household and building trade equipment and which retain paint, primers, and stain finishes in a manner similar to prior art building products as well as meet or exceed the structural properties of prior art building products.

DISCLOSURE OF INVENTION

The present invention comprises a weatherable building product made of wood members coated with a weatherability coating composition. The present invention also comprises a method for making a weatherable building product comprising coating a wood member with a weatherability coating composition.

The wood member can be made of solid wood or fiber-based materials such as, wood fiber or fibers of agricultural, waste, and recylate byproducts. A final coating of paint, primer, stain or other ultraviolet light-opaque covering may be applied to all surfaces of the weatherable building product.

In a preferred embodiment, the weatherability coating composition comprises an interpenetrating polymer network of an acrylic latex and a vinylidene chloride polymer. In a second embodiment, the weatherability coating composition is selected from the group consisting of polyurethane and acrylic-urethane hybrid polymers.

BEST MODE FOR CARRYING OUT THE INVENTION

The present invention relates to weatherable building product made of wood members which are resistant to water penetration and degradation due to water, moisture, and sunlight, and to a method of making weatherable building products. Examples of such building products include, but are not limited to, door jambs, end rails, stiles, rails, and compression molded door skins, interior and exterior trim products, pilasters, railings and posts, stairs, mull posts, dimensional members, thresholds, brickmould, ultra-light-, medium- or high-density fiberboard, oriented strand board, laminated strand lumber, laminated beams, plywood, particle board, and plastic wood. By wood members, it is meant at least one member made from solid wood or fiber-based materials such as, wood fiber or fibers of agricultural, waste, and recylate byproducts. The weatherability coating composition is preferably applied to the wood member after the wood member has been manufactured into the finished building product. The wood members preferably have average thicknesses of at least about 0.5 mm, more preferably less than about 75 mm, even more preferably about 0.75 mm to about 45 mm.

The wood members made of solid wood can be made of either hardwood or softwood. The wood preferably has a moisture (water) content of less than about 20 weight percent, more preferably about 4–12 weight percent, and most preferably about 6–9 weight percent. The wood is preferably dried in an oven, and more preferably a kiln-type oven to achieve such moisture content. Examples of usable woods include, but are not limited to, Ponderosa pine, oak, maple, ash, poplar, radiata pine, southern yellow pine, and cedar. The wood members can be either unitary wood members of pieced together wood members, such as finger-jointed wood members.

The wood members made of fiber-based materials can be made of wood fiber, wood fiber-wood flour mixtures, fibers of agricultural, waste, and recyclate byproducts, and mixtures thereof. The fiber-based materials are moldable or extrudable under heat and pressure to form building products, such as compression molded door skins or oriented strand board, by methods which are known in the art.

Examples of suitable wood fibers include wood chips, flakes, and scraps, the majority of which have an aspect ratio of about 3–100, preferably 5–80, and most preferably 8–35. Suitable sources for wood chips, flakes and scraps include, but are not limited to, kiln-dried wood elements, such as logs, bark, dimensional lumber, plywood, thin lumber, thick veneer and short veneer. Other suitable sources of wood chips, flakes and scraps include long flakes, strands, particles, planar shavings, and wood pulp. The wood fibers preferably have a moisture content of less than about 20 weight percent, more preferably about 4–12 weight percent, and most preferably about 6–9 weight percent.

The fibers of agricultural, waste, and recylate byproducts all preferably have an aspect ratio of about 3–100, preferably 5–80, and most preferably 8–35. Suitable sources for fibers of agricultural, waste, and recylate byproducts include, but not limited to, corn stalks, corn husks, corn cobs, sugar cane, sugar beets, straws and chaffs of all grains, wheat stalks, flax, linen, rice hulls, cotton, jute, hemp, bagasse, bamboo, jojoba, ramie and kenaf, recycled kraft paper, and newsprint, and blends thereof. The fibers of agricultural, waste, and recylate byproducts preferably have a moisture content of less than about 20 weight percent, more preferably less than 12 weight percent, even more preferably about 4–12 weight percent, and most preferably about 6–9 weight percent.

The wood members made of fiber-based materials may also include fillers such as sawdust, mica and wollastonite, excelsior, glass reinforcing fibers, glass fiber reinforcing veil mats, carbon reinforcing fibers, aramid reinforcing fibers, foaming/blowing agents, fungicides, mildewcides, pigments, dyestuffs, fragrances and combinations thereof.

Typically, wood members made from fiber-based materials include a polymeric or resinous binder to adhere the fibers together. The amount and type of binder varies depending on many factors which include, but are not limited to, type of wood member desired, type of fiber employed, type of binder employed, etc. Examples of suitable binders include, but are not limited to, phenol/formaldehyde resol, urea/formaldehyde, melamine/formaldehyde, polyisocyanates, and novolac phenolic (phenol-formaldehyde) resins. The preferred binder is novolac phenolic resin. A particularly preferred novolac phenolic resin is Georgian Pacific brand 2050 resin.

When these weatherable building products require a wood-like texture, the exterior surface can be manufactured to have a textured surface consisting of level portions and depressions. The depressions have a range of depth from about 0.25 mm to about 1.0 mm from the level portions. The building products may further include undercuts adjacent to the depressions. The undercuts have a range in the extent of undercutting from about 0.025 mm to about 0.10 mm from the depressions.

To assist in removal of molded product from such a textured mold, mold release agents such as calcium and zinc stearate may be blended into the fiber-filled novolac phenolic resin system at 0.25 to 5 weight percent of the system.

A particularly preferred wood member made of fiber-based materials comprises substrates, such as door skins and jambs, molded or extruded from fiber-filled novolac phenolic resin materials. The novolac phenolic content ranges from 2 to 60 weight percent of the wood member (oven dried basis) depending upon the exterior durability, mechanical strength and product economics. More preferably, the novolac phenolic resin is present in an amount of about 4 to about 40 weight percent, even more preferably about 4 to about 30 weight percent, yet even more preferably about 7 to about 25 weight percent, even more preferable yet about 7 to about 18 weight percent, and most preferably about 7 to about 15 weight percent.

The novolac phenolic resin can be from commercial sources such as Georgia Pacific's Parac 5500 series or Resi-Flake 2000 series. The mechanical strength properties of the final product can be tailored by which resin is chosen. Factors such as residual water content in the resin, molecular weight, melt viscosity and proprietary curing agents are among the variables that can be adjusted in designing the blend with various fibers and the end product.

The wood fibers for making the fiber-filled novolac phenolic resin wood members preferably comprise lignocellulosic fibers which are preparable from any suitable lignocellulosic precursor fibers. Examples of suitable lignocellulosic precursor fibers include, but are not limited to, chips, flakes and scraps of wood. Other sources of lignocellulosic fibers are known to those skilled in the art and include fibers of agricultural, waste, and recylate byproducts. The wood fiber content ranges from 40 to 98 weight percent of the wood member (oven dried basis), more preferably about 60 to 96 weight percent, even more preferably about 70 to about 96 weight percent, yet even more preferably about 75 to about 93 weight percent, and most preferably about 85 to about 93 weight percent.

The lignocellulosic precursor fibers are digested and refined into lignocellulosic fibers by methods which are known in the art. Generally, the lignocellulosic precursor fibers are digested with steam, between temperatures of about 120–250° C. for about 20–200 seconds. The best gauge of the completion of digestion and refinement are by the end use tests such as, humidity-induced fiber-pop, moldability in compression molding, and moisture linear expansion, and by color change of the lignocellulosic fiber mass from light yellow to golden brown. The lignocellulosic fibers preferably have a definable aspect ratio of 4–70, and more preferably 8–30.

The fiber-filled novolac phenolic resin material includes suitable curing/cross-linking agents. The most preferred agents are methylene sources such as hexamethylenetetramine ("hexa"), paraformaldehyde/ammonium carbonate, and reaction products of aldehydes with aromatic amines. The hexa is most preferably used in at least a "stoichiometric amount". This amount is about 8 to 12 weight percent based on the weight of solid novolac phenolic resin. Preferably, the hexamethylenetetramine is used in excess, for about 20–30% excess. It has been found that excess "hexa" is surprisingly efficient in increasing weatherability. However, hexa in amounts in excess of 30% of stoichiometry does not significantly further improve properties, and may cause some properties to decline. An upper limit of hexamethylenetetramine is about 40% in excess of stoichiometry, i.e., about 18% based on the weight of solid novolac phenolic resin.

The fiber-filled novolac phenolic resin building products, whether door skins, detail moldings, door jambs and/or thresholds, siding, sheetboard, or the like, are molded in a molding press under heat and pressure, in batch or continuous molding processes. The materials may have a textured exterior dictated by the mold surface. A variety of molds are suitable. Most preferred are molds prepared by nickel coating a cast of a real object whose surface is to be mimicked by chemical vapor deposition, as disclosed in U.S. Pat. No. 5,169,549 which is herein incorporated by reference.

The material is pressure formed at pressure of 120–14,500 kPa with or without steam. Pressure forming processes can include high pressure compression molding, low pressure compression molding, ram extrusion, ram injection, ram injection-compression, hydroforming, explosive forming, twin sheet or single sheet thermoforming with compression assist, vacuum-draw forming, and vacuum-stretch forming. The preferred pressure forming process is high pressure compression molding between 1,700 kPa and 6,800 kPa.

The steam exposure can range from 0 to 240 seconds, preferably 0–60 seconds at 198–225° C., and may be administered in multiple increments once the mold is essentially closed. Venting the mold through releasing mold pressure, evacuating the mold, or opening a stopcock to vent may be needed at several intervals during the pressure forming cycle to prevent blisters and eliminate accumulated volatiles.

The material may be pressed to a thickness of 0.75 mm to 45 mm if steam is applied only from one side of the platen. The thickness may be extended to 100 mm if steam is applied from both sides of the platen. The resultant density of produce ranges from 560 kg/$m^3$ to 1200 kg/$m^3$, preferably 800–1000 kg/$m^3$ to eliminate porosity suitable for capillary infiltration, provide mechanical strength, while fostering lower material usage costs as well as reducing the incidence of surface blisters.

In order to reduce the pressure forming cycle time, a post-press infrared, preferably far-infrared, radio frequency, or microwave bake oven may be substituted to continue the curing of the various resins. The curing oven ranges in temperature from 198° C.–225° C. with exposure inversely related from 20–120 sec depending on thickness of the pressure formed part and the wavelength of energy chosen.

The novolac phenolic resin may be added prior to or during fiber digestion, or may be added after digestion. Preferably, the novolac phenolic resin is solid and introduced to the fiber in a steam pressurized double disk grinder to assure intimate contact and thereby, coating of fiber that typically has moisture content of 4 to 12 weight or after the forming operation when stoichiometric quantities of hexamethylenetetramine, which may have been incorporated earlier in the filled novolac system, are reacted under heat of 170° C. to 195° C. Noticeable thermal degradation of wood fibers is apparent at 185° C. with correlated loss of mechanical properties of the filled system. Part thickness, required performance properties, speed of resin cure and elevated temperature process residence times determine how closely a product can be molded up to about 220° C. Other non-fibrous fillers can be added to the formulation for reasons of economics or other performance enhancements.

To render building products (i.e., the wood members) more resistant to water, moisture linear expansion, and degradation from water, moisture and sunlight, the wood member is coated with a weatherability coating composition. Preferably, the entire member is coated, although it is contemplated that less than the entire member (i.e., the parts of the member most susceptible to water contact) may be coated to minimize the cost of the member.

In a preferred embodiment the weatherability coating composition is a latex coating composition comprising particles of an interpenetrating polymer network of an acrylic polymer and a vinylidene chloride polymer. More specifically, the latex coating composition comprises polymeric particles suspended in an aqueous solution. The polymeric particles comprise an interpenetrating polymer network of an acrylic polymer and a vinylidene chloride polymer.

Generally, the process for preparing the latex coating composition in accordance with the present invention comprises providing an acrylic latex comprising an aqueous medium having dispersed therein particles of an acrylic seed particles, and adding to the acrylic latex, the vinylidene chloride and other monomers under conditions at which the vinylidene chloride will form a polymer within the acrylic seed particles, whereby a latex coating composition comprising acrylic seed particles having a vinylidene chloride polymer polymerized therein are formed.

More specifically, the interpenetrating polymer network latex compositions of the present invention are made by polymerizing a vinylidene chloride polymer, and more preferably, a vinylidene chloride copolymer, with acrylic seed particles. The vinylidene chloride polymer forms an interpenetrating polymer network in and with the acrylic latex seed particles. By an "interpenetrating polymer network", it is meant that the acrylate polymers and the vinylidene-chloride polymers described in the present invention, are intimately mixed on a molecular level. While we define an interpenetrating polymer network as being intimate molecular mixture of polymers, we do not preclude the possibility of grafting or physical entanglements or chemical reaction between polymers since the precise mechanism is still speculative. In fact such associations are likely, and are believed to be the reason for the enhanced properties of the finished interpenetrating polymer network. Many factors including ingredient selection and polymerization conditions, such as polymerization temperature, instantaneous free monomer concentration, initiator type, and the presence of double bonds or abstractable hydrogen in the seed polymer, may influence grafting between the acrylate and vinylidene phases, and thus may have consequences in the final structure and performance of the finished interpenetrating polymer network.

Preferably, the latex coating composition comprises, by weight, about 30% to about 70% solids, based on the weight of the coating composition, more preferably about 50% to about 65%, and most preferably about 60%.

The latex coating composition preferably comprises, by weight, based on total weight of the acrylic latex and the vinylidene chloride polymer, about 2% to about 50% acrylic latex and about 50% to about 98% vinylidene chloride polymer. The coating composition more preferably comprises, by weight, based on total weight of the acrylic latex and the vinylidene chloride polymer, about 5% to about 15% acrylic latex, and about 85% to about 95% vinylidene chloride polymer.

There is no criticality in the manufacture of the acrylic seed particles, although a styrene-acrylic copolymer seed particle is preferred. Small particle size is preferred, since the resulting interpenetrating polymer network can also have a smaller particle size and smaller particle size vinylidene latexes tend to settle less, and have an advantage in film formation. A preferred size for the seed particles is about 2000 Angstroms or less.

It is important that the seed latex swell in the presence of the vinylidene chloride monomer feed. A seed latex that does not swell will not form a suitable IPN. Styrene acrylic polymer latexes intended for industrial coatings applications impart good water resistance characteristics, and are thus, typically good seed polymer choices. It should be noted that the seed latex should not contain excess surfactants as they may promote excess initiation of new and separate vinylidene particles and may also compromise the water resistance of the polymeric films.

A preferred styrene acrylic latex is the commercially available Carboset CR-760 acrylic latex, available from the BF Goodrich Company as a 42% by weight acrylic copolymer emulsion. Others include the Carboset CR761 polymer and the Carboset CR763 polymer from BF Goodrich, HG 54 from Rohm & Haas, the A622 polymer from Zeneca, Inc., and the Pliolite 7103 polymer from Goodyear. Styrene acrylic latexes are made by emulsion polymerization techniques known to those skilled in the art, such as U.S. Pat. No. 4,968,741, which is incorporated herein by reference. There is no criticality in the ratio of styrene to acrylate, nor in the particular acrylate used as long as the seed swells in the vinylidene monomer feed. Other acrylic latexes can be employed as long as they provide a swellable seed particle in the manner as the styrene acrylate does. The amount of styrene acrylate seed polymer to be employed in the latex polymer composition is not critical. If too little seed polymer is used, then larger particle sizes may result and produce consequential handling difficulties. If too much seed polymer is used, a latex polymer with diminished properties will result. Usually, about 2 to 50 weight percent of the styrene acrylate polymer, based upon the total weight of the acrylate polymer and the vinylidene chloride polymer, will be employed, with about 5 to 15% by weight being preferred.

The vinylidene chloride copolymer comprises a combination of vinylidene chloride monomer, one or more alkyl acrylates having from 1 to 18 carbon atoms in the alkyl group and/or one or more alkyl methacrylates having 1 to 18 carbon atoms in the alkyl group, one or more aliphatic alpha-beta-unsaturated carboxylic acids, and a copolymerizable surfactant.

The amount of vinylidene chloride monomer will be in the range of about 65 to 90 parts by weight, based on parts per hundred weight of monomer for the vinylidene chloride polymer, with 70 to 83 parts by weight being preferred. The amount of the alkyl acrylates and/or methacrylates will be in the range of about 2 to 30 parts by weight, based on parts per hundred weight of monomer for the vinylidene chloride polymer, with 16 to 25 parts by weight being preferred. The amount of the carboxylic acids will be in the range of about 0.1 to 10 parts by weight, based on parts per hundred weight of monomer for the vinylidene chloride polymer, with 1 to 5 parts by weight being preferred. The amount of the copolymerizable surfactant will be in the range of about 0.1 to 5 parts by weight, based on parts per hundred weight of monomer for the vinylidene chloride polymer, with 0.4 to 1.0 parts by weight being preferred.

The vinylidene chloride monomer can be used with up to 25% by weight vinyl chloride monomer, based upon the weight of the vinylidene chloride monomer. Although, the use of 100% vinylidene chloride monomer is preferred.

The alkyl acrylates or methacrylates monomers are (meth) acrylate ester monomers of (meth)acrylic acid that have the formula

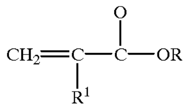

where R is selected from the group consisting of an alkyl radical containing 1 to 18 carbon atoms, an alkyoxyalkyl radical containing a total of 1 to 10 carbon atoms, and a cyanoalkyl radical containing 1 to 10 carbon atoms, and $R^1$ is selected from the group consisting of hydrogen and methyl. The alkyl structure can contain primary, secondary, or tertiary carbon configurations and normally contains 1 to 8 carbon atoms. Examples of such (meth)acrylic esters are ethyl (meth)acrylate, propyl (meth)acrylate, n-butyl (meth) acrylate, isobutyl (meth)acrylate, n-pentyl (meth)acrylate, isoamyl (meth)acrylate, n-hexyl (meth)acrylate, 2-methylpentyl (meth)acrylate, n-octyl (meth)acrylate, 2-ethylhexyl (meth)acrylate, n-decyl (meth)acrylate, n-dodecyl (meth)acrylate, n-octadecyl (meth)acrylate, and the like; methoxymethyl (meth)acrylate, ethoxypropyl (meth)acrylate, and the like; α, β- and γ-cyanopropyl (meth) acrylate, cyanobutyl (meth)acrylate, cyanohexyl (meth) acrylate, cyanooctyl (meth)acrylate, and the like; hydroxyalkyl (meth)acrylates as hydroxyethyl (meth)acrylates and the like and mixtures thereof.

More preferred are the (meth)acrylic esters wherein R is an alkyl group containing 1 to 8 carbon atoms or an alkoxyalkyl group containing a total of 1 to about 6 carbon atoms. Examples of such more preferred monomers are ethyl (meth)acrylate, propyl (meth)acrylate, n-butyl (meth) acrylate, n-pentyl (meth)acrylate, n-hexyl (meth)acrylate, n-octyl (meth)acrylate, 2-ethylhexyl (meth)acrylate, and the like; methoxyethyl (meth)acrylate, ethoxyethyl (meth) acrylate, and the like; and mixtures thereof.

The selection of the (meth)acrylates is not critical and various combinations can be employed. The choice will depend upon the requirements for the film with respect to hardness, flexibility, and/or water sensitivity. The swellability of the combination of monomers in phase should be considered in selection of the (meth)acrylates.

The carboxylic monomers useful in the production of the polymer latexes of this invention are the aliphatic alpha-beta-olefinically-unsaturated carboxylic acids and dicarboxylic acids containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group thus

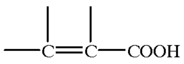

or as a part of a terminal methylene grouping thus $CH_2C<$. Olefinically-unsaturated acids of this broad class includes such widely divergent materials as the acrylic acids such as acrylic acid itself, methacrylic acid, ethacrylic acid, alpha-chloro acrylic acid, alpha-cyano acrylic acid and others, crotonic acid, sorbic acid, cinnamic acid, hydromuconic acid, itaconic acid, citraconic acid, mesaconic acid, muconic acid, glutaconic acid, aconitic acid, β-carboxy ethyl acrylate and others. As used herein, the term "carboxylic acid: includes the polycarboxylic acids and acid anhydrides, such as maleic anhydride, wherein the anhydride group is formed by the elimination of one molecule of water from two carboxyl groups located on the same polycarboxylic acid module.

The preferred carboxylic monomers for use in this invention are the monoolefinic acrylic acids having the general structure

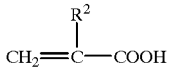

wherein $R^2$ is a substituent selected from the class consisting of hydrogen, halogen, monovalent alkyl radicals, monovalent aryl radicals, monovalent aralkyl radicals, monovalent alkaryl radicals and monovalent cycloaliphatic radicals. Illustrative acrylic acids of this class are acrylic acid itself, methacrylic acid, ethacrylic acid, chloro-acrylic acid, bromo-acrylic acid, cyano-acrylic acid, alpha-phenyl acrylic acid, alpha-benzyl acrylic acid, alpha-cyclohexyl acrylic acid, and others. Of this class, acrylic acid and methacrylic acid are preferred.

The copolymerizable surfactant both facilitates and becomes part of the vinylidene interpenetrating polymer network in the particles. Though higher levels of surfactants may be employed to replace the copolymerizable surfactant, low free surfactant levels offer advantages in water and particularly humidity resistance. Furthermore, higher surfactant levels may plasticize the vinylidene chloride interpenetrating polymer network. possibility damaging moisture vapor and gas transmission resistance. Thus, the preferred levels of copolymerizable surfactant allow use of very low levels of free surfactant, leading to performance advantages. In applications where performance demands allow, lower levels of copolymerizable surfactant within the stated ranges may be used with higher levels of free surfactants. Adjustments in polymerization conditions and ingredients known to those skilled in the art might be necessary to produce latexes with acceptable cleanliness and morphology as levels of copolymerizable surfactant and free surfactant are changed. The preferred copolymerizable surfactant is the sodium salt of an allyl ether sulfonate. They are commercially available, for example, as COPS 1 from Rhone Poulenc, Inc., which is sodium 1-allyloxy-2-hydroxypropyl sulfonate, which is supplied as a 40% solution in water.

The aqueous latex coating compositions can be formulated with, for example, anticorrosive pigments, and if the coating is expected to endure more than three months' exterior weathering, the coating must be covered with a primer or paint which is substantially opaque to ultraviolet light.

The latex coating compositions of the present invention are prepared by using emulsion polymerization techniques known to those skilled in the art. The vinylidene chloride monomers and other monomers, along with the copolymerizable surfactant and any surfactants and initiators may be batched, metered or otherwise added to particles of acrylate seed dispersed in an aqueous medium. The polymerization is usually done at between about 50° C. and 75° C., although the temperatures may vary between 5° C. and 100° C., and takes about 2 to 24 hours. The reaction time is largely dictated by the heat removal capabilities of the reactor employed, with shorter reaction times being preferred. The polymerizations are preferably conducted in the absence of air or oxygen.

The latex coating composition PERMAX 801 supplied by BF Goodrich (Cleveland, Ohio) is a preferred latex coating composition comprising particles of an interpenetrating polymer network of an acrylic polymer and a vinylidene chloride polymer latex coating compositions of the present invention.

The latex coating composition is preferably applied to a wood member whose surface temperature exceeds the minimum film forming temperature (MFFT) of the coating composition, and more preferably more than about 3° C. above the MFFT. For PERMAX 801 the MFFT is 20° C. Thus, the surface temperature of the member, when applying PERMAX 801, is at least about 23° C., more preferably at least about 40° C., and is usually less than about 90° C.

The wood member should be at a condition in terms of other environmental properties such as moisture content, that is desirable for the finished product and renders acceptable levels of service for the intended life. The preferred moisture content at coating is about 4–12 wt % moisture, most preferably about 6–9 wt %.

Application of the coating composition to the product in one step may be accomplished by a brush or other device having relatively low shear during application such as a curtain coater, a flow coater, immersion, or a roller.

By low shear we mean a shear condition that does not cause shear-induced polymerization of the polymer yielding little polymer clumps. A typical process condition near the limit of shear for the latex composition is mixing at 60 revolutions per minute with a 76-mm CONN IT low shear blade in an approximately 150-mm diameter mixing vessel.

The coating thickness can be 0.01-mm to about 3-mm, preferably 0.05-mm to 1-mm, most preferably for economic reasons 0.05-mm to 0.15-mm.

The member and coating can be dried at ambient temperature exceeding the MFFT. More preferably, the member and coating are dried for at least about 15 minutes, and more preferably about 30 minutes to about 3 hours, at temperatures at least about 3° C. above the MFFT. Most preferably, the member and coating are dried for at least about 45 to about 90 minutes, and more preferably about 60 minutes, at temperatures of about 25° C. to about 75° C., and more preferably about 45° C. to about 55° C. Drying under these elevated temperatures has been found to minimize the formation of micro-cracks, which may result from uncoalesced films.

The resulting coated wood members have moisture linear expansion as measured by ASTM D-1037 of less than about 0.1%, and more preferably less than 0.05%. Specifically, MDF compression molded door skins coated with the vinylidene chloride-acrylic IPN coating composition of the present invention have moisture linear expansions, according to ASTM D-1037 of less than about 0.1%, more preferably less than about 0.05%, even more preferably less than about 0.03% and most preferably 0.0%. Solid slabs of Ponderosa pine coated with the vinylidene chloride-acrylic IPN coating composition of the present invention, such as are used for door jambs, have moisture linear expansions according to ASTM D-1037 of less than about 0.1%, more preferably about 0.05%, even more preferably less than about 0.03% and most preferably about 0.0%.

Moreover, wood members coated with the vinylidene chloride-acrylic IPN coating composition of the present invention pass the accelerated aging and Midwest U.S. exterior weathering condition test set forth below.

An environmental chamber test which exposes only the exterior face of a building product to environmental extremes provides an accelerated aging test for the substrate and coating of the product. The environmental cycle of choice simulates two environments:

a continuous 95% relative humidity and 35° C. exposure such as found along southern U.S. coastal environments; and a cycle of temperature and humidity extremes featuring: from 95° C. to minus 29° C. and wet and dry conditions.

The test uses the extremes of temperature and moisture to accelerate changes in the building product which occur naturally during exposure to changing weather conditions. The product, or products, to be tested is placed within the walls of the chamber to expose the product to the degree of exposure similar to that it would receive in a field installation. The chamber is equipped with an atomizing spray heads which are capable of completely wetting the exposed surface of the product under testing. The test is capable of maintaining any of these conditions as described below.

Cycle 1

| Segment | Duration (hours) | Temperature (° C.) Start | Temperature (° C.) End | Rain Spray |
|---|---|---|---|---|
| 1 | ½ | 26 | −29 | No |
| 2 | 3 | −29 | −29 | No |
| 3 | ½ | −29 | 4 | No |
| 4 | 3 | 4 | 26 | Yes |
| 5 | 1 | 26 | 95 | No |
| 6 | 2 | 95 | 95 | No |
| 7 | 1 | 95 | 26 | Yes |
| 8 | 3 | 26 | 15 | Yes |
| 9 | ½ | 15 | −29 | No |
| 10 | 3 | −29 | −29 | No |
| 11 | 1 | −29 | 95 | No |
| 12 | 4 ½ | 95 | 95 | No |
| 13 | 1 | 95 | 26 | No |

Cycle 2

| Segment | Duration (per day) | Temperature Setting (° C.) | Relative Humidity Setting (%) | Rain Spray |
|---|---|---|---|---|
| 1 | 24 | 35 | 95 | As needed to maintain humidity |

A building product passes the above accelerated aging test if it has no recorded performance or aesthetic defects after 90 days of Cycle 2 followed immediately by 30 days of Cycle 1.

A field evaluation in the Midwest U.S. exterior weathering conditions involves mounting a door into jambs and other components necessary to make a entry door system. The assembled unit is then shimmed into a frame of about 100-mm square dimensional lumber having approximately the interior size of the frame slightly exceeds the exterior dimension of the entry door assembly. The entry system may either be tested with no overhang or other measure to shield the entry system from precipitation, sunlight, or other weathering agents or the entry system is placed behind a full view storm door where temperatures can reach 95° C. The entry system is periodically observed for failures. The test may last for 5–10 years, with no defects in performance or aesthetics permitted. This test can also be used for other types of building products.

EXAMPLE 1

The preferred vinylidene chloride-acrylic interpenetrating polymer network coating composition PERMAX 801 is brush applied to finger-jointed Ponderosa pine door jambs. The coating is allowed to dry on the jambs at ambient temperature (>20° C.) for 7 days to assure complete drying. Each coating is approximately 1 mm thick.

The moisture linear expansion of the door jambs of Example 1 according to ASTM D-1037 when shifting from 50% relative humidity to 90% relative humidity is about 0.053%.

EXAMPLE 2 AND COMPARATIVE EXAMPLE 1

The finger-jointed Ponderosa pine jambs of Example 1 are subjected to accelerated aging consecutive treatments of 95% relative humidity at 35° C. for 90 days, followed by 30 days of twice-daily temperature cycles of −29° C. to 95° C. having rain simulated during one of these cycles. The result is no significant degradation.

Comparative Example 1 is prime painted, commercially available fingerjointed Ponderosa pine jambs. The jambs of Comparative Example 1 are not coated with the vinylidene chloride-acrylic coating composition of the present invention. The jambs of Comparative Example 1 are subjected to the same accelerated aging test of Example 2. These commercially available jambs had to be replaced three times. The failure modes of the prime painted jambs included degradation of the finger-joints, dimensional swelling where water had been wicked, as well as growth of mold and mildew.

EXAMPLE 3 AND COMPARATIVE EXAMPLES 2, 3 AND 4

Example 3 is a door assembled with medium-density or high-density fiberboard molded skins containing at least 7 wt % cured novolac phenolic resin, preferably 7 wt % to 25 wt %, and most preferably 8–15 wt %; and equilibrated to about 4–8 wt % moisture have been treated with an approximately 1-mm thick coating of the vinylidene chloride-acrylic coating composition employed in Example 1. The door assembly with the coated skins of Example 3 are subjected to consecutive treatments of 95% relative humidity at 35° C. for 90 days, followed by 30 days of twice-daily temperature cycles of −29° C. to 95° C. having rain simulated during one of these cycles. The result is no significant degradation.

Comparative Example 2 is a commercially available molded door skin coated with a melamine coating. The lignocellulosic hardboard door skin contains about 4 wt % of phenolic-formaldehyde (resol) resin. This coated door assembly cups at least 8 mm in the center of the skin exposed to the test environment within two days. It also exhibits delamination of the skin from the wood frame after six days.

Comparative Example 3 is an identical door to Comparative Example 2, except that no melamine coating is applied. Comparative Example 3 cups at least 30 mm in the center of the skin and delaminates within two days.

Comparative Example 4 is a door assembly identical to Example 3 except that no vinylidene chloride-acrylic coating is applied. Comparative Example 4 cups about 6 mm in the center of the skin within four days.

After exposure to the above laboratory environmental simulations, samples of Example 3 and fresh samples of Comparative Examples 2–4 are placed into Midwest U.S. exterior weathering conditions with either no overhang protection from the weather or behind a full view storm door where the temperature can reach 95° C. No degradation or cupping of the doors or the jambs of Example 3 is observed after at least fifteen months of exposure to the Midwest U.S. exterior weathering conditions. Comparative Example 2 cups, warps and delaminates to the point where it is no longer commercially acceptable within three months. Comparative Example 3 cups, warps and delaminates to the point where it is no longer commercially acceptable within two months. Comparative Example 4 cups, warps and delaminates to the point where it is no longer commercially acceptable within four months.

The moisture linear expansion of the door skins used in the door assemblies of Example 3 measure according to ASTM D-1037 when shifting from 50% relative humidity to 90% relative humidity is 0.02%. The moisture linear expansion of the door skins used in the door assemblies of Comparative Example 4 measure according to ASTM D-1037 when shifting from 50% relative humidity to 90% relative humidity is 0.461%.

EXAMPLE 4 AND COMPARATIVE EXAMPLE 5

Example 4 is identical to Example 3 except that two holes are plunge-routed into the door to allow the insertion of doorlites and a 54-mm lock bore hole has been bored about 70-mm in from the edge of the lock stile where the lock and latch hardware would be inserted. The rim of one of the two doorlite openings is treated with an additional approximately 0.5 mm thick layer of the vinylidene chloride coating composition employed in Example 1. The other doorlite opening is left untreated. Both doorlite openings are fitted with standard doorlite inserts effectively sealing the cut edges from exposure to direct water, but not moisture vapor. After the laboratory simulations and about 15 months for field exposure for Example 3, the uncoated doorlite opening has minor swelling in thickness with force sufficient to crack the doorlite frame clamped to it while neither the coated doorlite opening nor the lock bore reveals any degradation.

Comparative Example 4 is identical to Comparative Example 2, except that a similar 54-mm hole is bored into the lock stile about 70-mm from the edge of the lock stile. Comparative Example 5 is weathered in the same manner and exhibits swelling at the lock bore after exposure to the laboratory simulations within 8 days.

In a second embodiment, the weatherability coating composition comprises a polyurethane or acrylic-urethane hybrid polymers coating composition. Preferably, the polyurethane or acrylic-urethane hybrid polymers have number averaged molecular weight greater than 100,000. The coating composition based on polyurethane or acrylic-urethane hybrid polymers may be doped with various ultraviolet protection packages known in the art, as well as fungicides. The coating composition based on polyurethane or acrylic-urethane hybrid polymers have also been found to provide a limited and uniform surface porosity which permits enhanced staining and painting of the finished products, especially at lower densities of the products.

Application of either coating composition of the second embodiment to the product in one step may be accomplished by a brush or other device having relatively low shear during application such as a curtain coater, a flow coater, immersion, or a roller.

By low shear we mean a shear condition that does not cause shear-induced polymerization of the polymer yielding little polymer clumps. A typical process condition near the limit of shear for the latex composition is mixing at 60 revolutions per minute with a 76-mm CONN IT low shear blade in an approximately 150-mm diameter mixing vessel.

The coating thickness (dry) can be 0.01-mm to about 3-mm, preferably 0.05-mm to 1-mm, more preferably for economic reasons 0.05-mm to 0.15-mm. Most preferably, the coating thickness of the coatings of the second embodiment are 0.018 mm to 0.125 mm. The coatings of the second embodiment can be dried at ambient temperature or at elevated temperatures of about 25° C. to about 75° C.

EXAMPLE 5

The second embodiment of the present invention may be directed to a door assembly having an inserted full partial core or a core formed in-situ positioned within a frame. A pair of opposed molded skins with downstanding ribs made by the present invention are attached to the frame, which may also be made by the present invention. There are edges adjacent the skin. The skins are made of a composite board of filled novolac phenolic resin prepared within 15 to 25 weight percent novolac. The filler is a kiln-dried soft-wood wood flour derived from kiln-dried lumber, veneers of various thicknesses, flakes, chips, excelsior, strands, wood particles or wood fiber bundles. High lignin content wood flours work best because lignin is the most subject to acid hydrolysis in reacting with the phenolic resins. The ranking is lignin, hemicellulose and cellulose. In reported reactions, the wood acidity is neutralized by reaction with sufficient quantities of phenolic resins.

Comminuted paper products are less suitable because during paper manufacture the wood products have been delignified. Kiln-dried materials with moisture contents of 4 to 12 weight percent are preferred so as to avoid any flash tube drying/evaporation process steps typically found when green or moist wood sources are used. Softwood has more lignin content than hardwood ranging from 25 to 35 weight percent versus 18 to 25 weight percent depending upon tree species. However, hardwood wood flours will also perform well in this product.

Each of the door skins has an interior surface and an exterior surface. The interior surface is adjacent to the core. The exterior surface has either a textured surface consisting of level portions and depressions. The depressions have a range of depth from about 0.25 mm to about 1.0 mm from the level portions. The skins further include undercuts adjacent to the depressions. This is made possible by tailoring material flexibility and mold release agents when partially cured and hot. The process window of resin-content, cure state and type is very difficult to measure or predict because of testing and timing constraints. A use test is most applicable. The undercuts have a range in the extent of undercutting from about 0.025 mm to about 0.10 mm from the depressions. Calcium stearate can be blended into the mat formulation at 1 to 3 weight percent to aid in releasing from the undercuts.

Each door skin has a downstanding rib at the edge to provide resistance to crushing damage of the edge during manufacture, transport or use. In addition, these downstanding ribs can aid alignment during assembly as it engages or is adjacent to the frame and other components such as a lock block.

Each of the door skins is sealed in this embodiment on the interior, exterior surfaces and any sides that may arise from the skin thickness with a 0.1–1 mm thick high molecular weight aliphatic or cycloaliphatic urethane polymer film coating. The film coatings may include other conventional additives, adjuvants and stabilizers. Dyes, pigments and/or fillers can also be included for particular purposes, such as tint, color, opacity, fungal resistance, microbial resistance, anti-mar and gloss development agents as desired. This coating imparts additional surface durability, additional moisture resistance and uniformity of surface for subsequent coatings without experiencing significant soaking of the coating into the product surface. If this coating is trimmed off in the filed, the intimately bonded novolac phenolic resin will remain sufficiently waterproof to prevent objectionable product dimensional change or delamination.

EXAMPLE 6

The second embodiment of the present invention may be directed to exterior trim and siding for residential housing having a single profile produced by an extrusion process possibly accompanying by a rotary shaping mold or vacuum sizing flanges with slots for expansion and contraction with heat and humidity. The flanges are lapped by the adjacent piece of siding. The material contains 15 to 40 weight percent phenolic resin. The upper limit is determined by the design allowances for linear thermal and humidity expansion. The linear humidity expansion coefficients varies with the thickness of a redundant seal coat, as well as the fraction of resin present. The water based acrylic-polyurethane hybrid polymer seal coat such as Air Products 620 or Sancure™ AU4010 of BF Goodrich (Brecksville, Ohio) resin is doped with 0.25 to 1.0 weight percent of a water miscible fungicide such as Polyphase P20T by Troysan to cover all exposed exterior surfaces. The thermal expansion coefficients is dominated by the resin fraction present in the design. At approximately 50%, the phenolic resin matrix becomes effectively continuous, thereby significantly changing the physical properties, such as coefficient of linear thermal expansion. The lower limit allows both good water absorption resistance and flow through a single or twin screw extruder.

The resin and sealer are prepared in the same manner as in Example 5. The surface may also be textured as in Example 5.

EXAMPLE 7

The second embodiment of the present invention may be directed to a composite beam, such as non-structural porch railings. Medium density board profiles of density 590 $kg/m^3$ to 800 $kg/m^3$ and novolac phenolic resin content of 25 to 40 weight percent (oven-dried basis) are extruded as a tube and shaped in a heated die land-vacuum sizer or extruded to near net size. The medium density board can also be extruded in L-sections or lineals and adhered into a rectangle. Assembly of the composite beam involves injecting the tube of medium density board with foam, including polyurethane foam 32 $kg/m^3$ to 250 $kg/m^3$, polystyrene packaging foam of 16 $kg/m^3$ to 50 $kg/m^3$, or blocks of various foams adhered to in the interior walls of the beam.

The beam as formed from adhered profiles may have downstanding ribs adjacent to additional profiles for ease of fit during assembly. Texturing of the exterior surface to simulate wood grain may be introduced after the product has emerged from the die and is still warm and not fully cured using a fixtured stamping incorporating the texture.

EXAMPLE 8

The second embodiment of the present invention may be directed to a reinforced composite sheet for exterior sheathing of a residence. Reinforced medium density board with novolac phenolic resin content of 20 to 40 weight percent (oven-dried basis) is compression molded with a reinforcement situated either between multiple mats or on the exterior surface of an outermost mat. The reinforcement may cover only specific areas of the product needing stiffening or cover the entire area of the product. The reinforcement may be a tow, woven mat, needled mat, high density mat, veil symmetrically or unsymmetrically oriented layers of chopped fibers of reinforcement or randomly chopped fibers of reinforcement. The reinforcements may include, but are not limited to, fiberglass, aramid fibers, polyamide fibers, oriented thermoplastic fibers, carbon fibers; polyester fibers and polyethylene terphthalate fibers; and blends thereof. The percentage of reinforcement is determined by the performance application of the product, but may range to 70 weight percent on an oven dry basis.

The reinforced composite sheet may be additionally covered with surface layers of moisture barriers, thermal reflectors or decorative film. These may be integrally molded to the surface during the compression molding operation or adhered to the surface after molding.

EXAMPLE 9

The second embodiment of the present invention may be directed to structural product approximate C-channel profiles for window frame lineals extruded using a ram extruder and a die capable of orienting the molecules of the novolac resin. In this product, the 25 to 40 weight percent (dry oven basis) of novolac resin is compounded with the fiber, but without hexamethylenetetramine. This blend is then made molten in a feed extruder before being formed into a compressed billet and allowed to cool to just below the melting point. The reaction rate of the hexamethylenetetramine is adjusted in terms of its transition from solid to liquid to allow the material sufficient time to be pushed through a special approximately hyperbolic profile die that causes the molecules of polymer to stretch into an oriented alignment to boost stiffness. The filler is also oriented by virtue of flow. As an alternative, the hexamethylenetetramine is injected into the die or applied at the outlet to permit timely curing. The die is designed with either a constant or decreasing elongation strain rate. The product exiting the die is placed under tension immediately and allowed to cool under tension to approximately 100° C.

The profile may be decorated as described in Examples 5 and 8.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A method for making a weatherable building product comprising:

coating at least a portion of a wood member with a coating composition comprising an interpenetrating polymer network of an acrylic latex and a vinylidene chloride polymer.

2. The method of claim 1 wherein the vinylidene chloride polymer comprises vinylidene chloride, and one or more alkyl acrylates having from 1 to 18 carbon atoms in the alkyl group and/or one or more alkyl methacrylates having 1 to 18 carbon atoms in the alkyl group.

3. The method of claim 2 wherein the vinylidene chloride polymer further comprises one or more aliphatic alpha-beta-unsaturated carboxylic acids.

4. The method of claim 3 wherein the vinylidene chloride polymer further comprises a copolymerizable surfactant.

5. The method of claim 4 wherein the surfactant comprises an ethylenically unsaturated sulfonate.

6. The method of claim 2 wherein the acrylic latex comprises an acrylic latex seed particle.

7. The method of claim 6 wherein the seed particle comprises a styrene acrylic latex.

8. The method of claim 7 wherein the particle size of the seed particle is less than about 2,000 Angstroms.

9. The method of claim 2 wherein the vinyl chloride polymer comprises about 65 to 90 parts by weight of vinylidene chloride, about 2 to 30 parts by weight of alkyl acrylates and/or methacrylates, about 0.1 to 10 parts by weight of carboxylic acid, and about 0.1 to 5.0 parts by weight of copolymerizable surfactant, all parts being based upon parts per hundred weight of monomer.

10. The method of claim 1 further comprising drying the coated wood member at a temperature of about 25° C. to about 90° C. for at least about 5 minutes.

11. The method of claim 1 wherein the wood member comprises solid wood or fiber-based materials.

12. The method of claim 11 wherein the wood member comprises pine.

13. The method of claim 11 wherein the wood member is made of fiber and resin.

14. The method of claim 13 wherein the resin comprises novolac phenolic resin and is present in an amount of about 2 to about 30 weight percent, based on the weight of the wood member.

15. The method of claim 14 wherein the fiber comprises lignocellulosic fiber precursor material.

16. The method of claim 15 wherein the fiber is made from wood chips, flakes, and scraps, the majority of which have an aspect ratio of about 3–100.

17. The method of claim 1 wherein the wood member has an average thickness of about 0.5 mm to about 75 mm.

18. The method of claim 15 wherein the wood member has an average thickness of about 0.75 mm to about 45 mm.

19. The method of claim 18 wherein the wood member is made by pressing the fiber and the resin together under a pressure of 120–14,500 kPa without steam being present.

20. The method of claim 18 further comprising drying the coated wood member at a temperature of about 25° C. to about 90° C. for at least about 5 minutes.

21. A weatherable building product comprising:

a wood member;

at least a portion of the member being coated with a coating composition comprising an interpenetrating polymer network of an acrylic latex and a vinylidene chloride polymer.

22. The weatherable building product of claim 21 wherein the vinylidene chloride polymer comprises vinylidene chloride, and one or more alkyl acrylates having from 1 to 18 carbon atoms in the alkyl group and/or one or more alkyl methacrylates having 1 to 18 carbon atoms in the alkyl group.

23. The weatherable building product of claim 22 wherein the vinylidene chloride polymer further comprises one or more aliphatic alpha-beta-unsaturated carboxylic acids.

24. The weatherable building product of claim 23 wherein the vinylidene chloride polymer further comprises a copolymerizable surfactant.

25. The weatherable building product of claim 24 wherein the surfactant comprises an ethylenically unsaturated sulfonate.

26. The weatherable building product of claim 22 wherein the acrylic latex comprises an acrylic latex seed particle.

27. The weatherable building product of claim 26 wherein the seed particle comprises a styrene acrylic latex.

28. The weatherable building product of claim 27 wherein the particle size of the seed particle is less than about 2,000 Angstroms.

29. The weatherable building product of claim 22 wherein the vinyl chloride polymer comprises about 65 to 90 parts by weight of vinylidene chloride, about 2 to 30 parts by weight of alkyl acrylates and/or methacrylates, about 0.1 to 10 parts by weight of carboxylic acid, and about 0.1 to 5.0 parts by weight of copolymerizable surfactant, all parts being based upon parts per hundred weight of monomer.

30. A building product comprising a substrate made of from about 15 to about 40 weight percent novolac phenolic resin and from about 60 to 85 weight percent filler selected from the group consisting of wood fiber having a moisture content from about 4 to about 12 weight percent and agricultural waste having a moisture content of less than 12 weight percent, and said substrate being coated with a polymer film coating selected from the group consisting of polyurethane and acrylic-urethane hybrid polymers.

31. The building product of claim 30 wherein said agricultural waste is selected from the group consisting of corn stalks, corn husks, corn cobs, straws, chaffs, flax, rice hulls, cotton, jute, hemp, bagasse, bamboo, jojoba, ramie and kenaf.

32. The building product of claim 30, wherein said polymer film coating has a number-averaged molecular weight greater than 100,000.

33. The building product of claim 30 wherein said polymer film coating includes additives selected from the group consisting of dyes, pigments and gloss control agents.

34. The method of claim 1 further comprising providing a layer of paint on top of the wood member coated with the coating composition.

35. The weatherable building product of claim 21 further comprising a layer of paint covering the wood member coated with the coating composition.

36. The building product of claim 30 wherein the polymer film coating is one or more acrylic-urethane hybrid polymers.

37. The building product of claim 30 wherein the polymer film coating is coated directly on said substrate.

* * * * *

UNITED STATES PATENT AND TRADEMARK OFFICE

CERTIFICATE OF CORRECTION

PATENT NO. : 6,383,652 B1 Page 1 of 1
DATED : May 7, 2002
INVENTOR(S) : G. Daniel Templeton, Kenneth J. West, Ronald C. Minke, Cem A. Porter and S. Hunter W. Brooks It is certified that error appears in the above-identified patent and that said Letters Patent is hereby corrected as shown below:

Title page,
Related U.S. Application Data, please correct the filing date of "Jan. 7, 1999" to -- Jan. 7, 1997 --

Signed and Sealed this

Eighth Day of October, 2002

*Attest:*

JAMES E. ROGAN

*Attesting Officer*

*Director of the United States Patent and Trademark Office*